United States Patent
Biotteau et al.

(10) Patent No.: US 8,771,633 B2
(45) Date of Patent: Jul. 8, 2014

(54) LIME-BASED COMPOSITIONS, METHOD FOR MAKING THEM AND THEIR USE IN TREATING WATER AND SLUDGE

(75) Inventors: Laurent Biotteau, Saint Christo en Jarez (FR); Gaetan Blandin, Maulevrier (FR)

(73) Assignees: S.A. Lhoist Recherche et Developpement, Ottignies-Louvain-La-Neuve (BE); SNF S.A.S., Andrezieux (FR)

( * ) Notice: Subject to any disclaimer, the term of this patent is extended or adjusted under 35 U.S.C. 154(b) by 397 days.

(21) Appl. No.: 12/826,066

(22) Filed: Jun. 29, 2010

(65) Prior Publication Data

US 2010/0313619 A1 Dec. 16, 2010
US 2013/0055777 A9 Mar. 7, 2013

Related U.S. Application Data

(63) Continuation of application No. PCT/EP2010/053478, filed on Mar. 17, 2010.

(30) Foreign Application Priority Data

Mar. 17, 2009 (BE) .................... 2009/0162

(51) Int. Cl.
*C01F 11/02* (2006.01)
*B01J 20/04* (2006.01)
*B01J 20/22* (2006.01)

(52) U.S. Cl.
USPC ............ 423/635; 502/400; 502/401; 502/402

(58) Field of Classification Search
USPC ............................ 423/635; 502/400, 401, 402
See application file for complete search history.

(56) References Cited

U.S. PATENT DOCUMENTS

| | | | |
|---|---|---|---|
| 4,675,114 A | 6/1987 | Zagyvai et al. | |
| 4,711,727 A | 12/1987 | Matthews et al. | |
| 4,849,128 A | 7/1989 | Timmons et al. | |
| 5,128,046 A | 7/1992 | Marble et al. | |
| 8,147,703 B2 | 4/2012 | Remy | |
| 2006/0030102 A1 | 2/2006 | Lee et al. | |
| 2006/0251585 A1* | 11/2006 | Pringels et al. | 424/46 |
| 2008/0028811 A1* | 2/2008 | Gombart et al. | 71/15 |

FOREIGN PATENT DOCUMENTS

| | | |
|---|---|---|
| CN | 1621371 | 6/2005 |
| GB | 1510930 | 5/1978 |
| JP | 2006247630 A | 9/2006 |
| WO | 0047527 | 8/2000 |
| WO | WO 2006/030102 A2 | 3/2006 |

OTHER PUBLICATIONS

IUPAC Compendium of Chemical Terminology, "Coagulation (flocculation)." (c)2012 IUPAC. Visited Dec. 26, 2012 at http://goldbook.iupac.org/PDF/C01117.pdf ; doi:10.1351/goldbook.C01117.*

* cited by examiner

*Primary Examiner* — Stanley Silverman
*Assistant Examiner* — Daniel Berns
(74) *Attorney, Agent, or Firm* — Charles D. Gunter, Jr.

(57) ABSTRACT

A composition based on lime comprising at least one mineral agent consisting of slaked lime in the solid phase and of an organic polymer incorporated into said solid phase, a method for its making and the use for its application in the treatment of water and sludge, in particular for conditioning sludge before dewatering.

22 Claims, No Drawings

LIME-BASED COMPOSITIONS, METHOD FOR MAKING THEM AND THEIR USE IN TREATING WATER AND SLUDGE

CROSS-REFERENCE TO RELATED APPLICATIONS

The present application is a continuation of International Application PCT/EP2010/053478, with an international filing date of Mar. 17, 2010, entitled "Composition Based on Calcium Hydroxide, Method for the Production Thereof and Use of the Same For Treating Water and Mud," by Laurent Biotteau et al., now abandoned, which in turn claimed priority from Belgium Application No. 2009/0162, filed Mar. 17, 2009, by the same inventors.

The present invention relates to a composition based on lime comprising at least slaked lime in a solid phase and at least one organic polymer.

In the sense of the invention, by the term of <<slaked lime>>, is meant lime consisting of an assembly of solid particles mainly of calcium dihydroxide $Ca(OH)_2$ which is the result of the reaction of quick lime with water, a reaction called hydration or slaking. Slaked lime is also called hydrated lime. Subsequently, calcium dihydroxide will be simply called calcium hydroxide or $Ca(OH)_2$.

Generally, the obtained slaked lime may of course contain impurities, mainly from quick lime. Slaked lime may appear as a powder or as an aqueous suspension called milk of lime.

Slaked lime is notably used in treating water or sludge. For example, document U.S. Pat. No. 4,711,727 mentions the treatment of water with slaked lime and with an organic flocculent contained in a suspension.

Treatments for purifying drinking, waste or industrial water generate residues called sludge. This sludge is first separated from purified water and then treated in order to stabilize them and to concentrate them.

The treatment of sludge, in particular urban and industrial sludge, notably comprises a step for conditioning and solid/liquid separation, also called dewatering, notably on a belt filter, a centrifuge or a filter press with chambers and/or membranes.

The notion of conditioning, in particular chemical conditioning, should be understood in the present invention as defined by Degrémont in <<Mémento Technique de l'eau, Edition du Cinquantenaire 1989, $9^{th}$ edition>> in Chapter 19, in particular at pages 949-959.

By the terms of <<sludge>> in the sense of the invention, are meant a residue having a dry material content of at least 0.5%, often greater than or equal to 1% The sludge may be mineral or organic or oily.

Incorporation of a calcium compound, generally lime, is often associated with the aforementioned treatment, in order to condition but also to hygienize and/or stabilize sludge for their long term storage (pile strength, etc.) or to further improve on a long term basis their properties of use (possibility of being pelletizated, spreadability, etc.) or in view to increase their agronomical value. The calcium compound may be added to the sludge before (pre-liming) and/or after (post-liming) the aforementioned dewatering step.

Conditioning of sludge therefore is in reality a treatment in which the characteristics of the sludge are modified in order to facilitate the separation of the solid phase and of the liquid phase.

Among the different known conditionings aiming at preparing the sludge, organic conditioning and mineral conditioning are notably distinguished.

The so-called organic conditioning: the use of an organic polymer as a single flocculent (typical dosage from 2 to 20 kg per ton of dry solids). Only synthetic polyelectrolytes with long chains (high molecular weight, notably based on polyacrylamide) are effective; they form voluminous flocks.

The so-called mineral conditioning: the joint use of an iron or aluminium salt, such as ferric chloride (typical dosage: 3-10% by weight based on the treated dry material) and of lime (typical dosage: 10-40% by weight based on the treated dry material). This conditioning method produces a fine flock but very robust towards stresses. Nevertheless, the use of iron salts is not without posing an exploitation problem such as corrosion of the stainless steel or cast iron ducts and filters, risk of burns for the personnel . . . .

There also exist mixed conditionings (mineral and organic) in order to optimize the dewatering performances.

Another possibility of mixed conditioning is disclosed in document EP 1 154 958 (WO 00/47527). The disclosed method teaches an addition of lime as a mineral agent to industrial sludge, lime selected for preventing a too rapid rise in the pH of the sludge to which lime was added.

In document WO2008/058973, a method for treating sludge with lime is described in which, since cationic polymers generally rapidly degrade from a pH value over 9 or 10, an anionic organic flocculent is added to the sludge. Since the anionic flocculent has an optimum activity at pHs beyond 10-12, it is therefore preferable to produce a rapid rise in pH which is perfectly possible by adding lime to the sludge.

As this is seen, all the conditioning methods above have drawbacks. Organic conditioning is not the best suited for certain dewatering systems such as filter presses; the other mentioned conditionings notably resort to iron salts, for which it is preferable to reduce the use because of the aforementioned problems, or are further limited, notably in the selection of the lime.

It is therefore useful to be able to combine the advantages of organic polymers, notably for their performances at a small dose, and of a mineral agent, which notably provides structure and resistance, while limiting the aforementioned drawbacks of iron salts or the like. As a mineral agent, a calcium compound further imparts the properties mentioned above.

So there is a need for having a composition available, notably comprising a mineral agent based on slaked lime and at least one organic polymer capable of conditioning the sludge by itself, simply, safely and effectively, preferably in a limited number of steps. In particular, it is advantageous that the aforementioned composition be a solid, easy to make and to handle, preferably stable over time, and easy to incorporate into the sludge to be treated. The polymer in minor quantity, should also be well distributed relatively to the mineral agent. Advantageously, it is useful that the aforementioned mineral agent only be added once during the treatment of the sludge, and therefore that it have also effectiveness after dewatering (post-treatment).

The object of the invention is therefore to overcome the insufficiencies of the state of the art in these respects in order to provide a solution to these expectations, without however altering the physical properties of each of the two agents (the mineral and the polymer).

According to the invention, provision is made for a composition in which said organic polymer is incorporated into said solid phase of the slaked lime, and characterized in that said lime-based composition is a solid composition.

Consequently, as this may be ascertained, the invention relates to a lime-based composition in which intimate contact exists between the organic polymer and at least one portion of the mineral agent, in particular the slaked lime, which gives proper distribution of the polymer in the mineral agent. By the fact that said organic polymer is incorporated into the solid phase of mineral agent, in particular of slaked lime, the organic polymer which is a minority component is in reality well distributed at the surface and/or within the solid phase of the mineral agent, unlike simple mixing of the components.

Further, it was very surprisingly observed that the organic polymer incorporated into the solid phase preserves its physical properties notably for conditioning prior to sludge dewatering.

In an alternative embodiment, the composition according to the invention further comprises a sufficient amount of water in order to form an aqueous suspension, which will for example be suitable when milks of lime are desired. In the aforementioned embodiments, the composition a priori appears as a solid, generally a powdery solid, but of course in an alternative embodiment of the invention, the composition may appear as a suspension.

In an advantageous embodiment, said mineral agent further comprises quick lime. As this may be ascertained in this particular embodiment, the mineral agent of the composition of the invention essentially consists of quick lime and slaked lime.

By quick lime, is meant a mineral solid compound, for which the chemical composition is mainly calcium oxide CaO. Quick lime is commonly obtained by calcination of limestone, mainly consisting of $CaCO_3$, a few percent of which may subsist in the lime Quick lime contains impurities, i.e. compounds such as magnesium oxide MgO, silica $SiO_2$ or further alumina $Al_2O_3$, etc., in an amount of a few percent. It is understood that these impurities are expressed in the aforementioned forms but may in reality appear in different phases.

The composition according to the invention essentially appears as residual quick lime particles, possibly partly coated with a layer of solid phase having a mixed $Ca(OH)_2$/organic polymer composition, wherein the organic polymer is intimately and homogeneously distributed.

Of course, the present invention also covers compositions comprising residual quick lime particles at least partly coated with the aforesaid mixed composition layer as well as non-coated quick lime particles.

In an advantageous embodiment of the composition according to the invention, slaked lime is present in an amount ranging from 0.5 to 99.8% by weight based on the weight of the composition, preferably from 1 to 99% and more preferentially from 10 to 70% by weight based on the total weight of the composition.

Additionally and advantageously, said organic polymer is present in an amount ranging from 0.2 to 10% by weight, preferably from 0.5 to 8% by weight and more preferentially from 1 to 6.5% by weight based on the total weight of the composition.

Further, in an alternative according to the invention, said quick lime is present in an amount ranging from 0.1% to 99.3%, preferably from 20 to 80% by weight based on the total weight of the composition.

In particular, the mineral agent of the composition according to the invention essentially consists of quick lime and slaked lime. Slaked lime is comprised between 5 g and 1,000 g per 1,000 g of lime, the remainder of the lime being in the form of quick lime. In an embodiment of the invention, slaked lime is comprised between 10 g and 990 g per 1,000 g of lime, notably between 20 g and 900 g, advantageously between 50 g and 800 g, and in particular between 100 g and 700 g per 1,000 g of lime.

The compositions according to the invention advantageously comprise between 2 g and 100 g of organic polymer (expressed in active material AM) for 1 kg of lime (expressed as slaked lime $Ca(OH)_2$ equivalents), preferably between 5 g and 80 g of the aforementioned organic polymer for 1 kg of lime, more preferentially between 10 g and 65 g of the aforementioned organic polymer for 1 kg of lime.

In a particular embodiment of the invention, said organic polymer is a hydrophilic linear, branched, and/or crosslinked polymer of non-ionic, anionic, cationic or amphoteric nature. Because of its hydrophilicity, said organic polymer has affinity with water and may therefore be suspended or dissolved in an aqueous phase, which may be used subsequently for slaking, at least partial slaking of the quick lime, in order to form the composition according to the invention, containing a predetermined amount of slaked lime.

The invention relates to the technical sector of organic hydrophilic polymers. According to the invention, the polymers used are soluble in water and may be of non-ionic, anionic, cationic or amphoteric nature.

In practice, in an embodiment, the polymer used may be obtained from one or more of the monomers selected from:
a) anionic monomers having a carboxylic function (e.g.: acrylic acid, methacrylic acid, and their salts . . . ) or having a sulfonic acid function (e.g.: 2-acrylamido-2-methylpropane sulfonic acid (AMPS) and salts thereof . . . ).
b) non-ionic monomers: acrylamide, methacrylamide, N-vinyl pyrrolidone, vinyl acetate, vinyl alcohol, acrylate esters, allyl alcohol, N-vinyl acetamide, N-vinylformamide,
c) and/or cationic monomers: in particular and in a non-limiting way, mention will be made of dimethylaminoethyl acrylate (DMAA) and/or dimethylaminoethyl methacrylate (DMAEMA) either quaternized or salified, dimethyldiallylammonium chloride (DADMAC), acrylamido propyltrimethyl ammonium chloride (APTAC) and/or methacrylamido propyltrimethyl ammonium (MAPTAC), possibly in association with one or more hydrophobic monomer(s) preferentially selected from the group comprising esters of (meth)acrylic acid with an alkyl, arylalkyl and/or ethoxylated chain, derivatives of (meth)acrylamide with an alkyl, arylalkyl or dialkyl chain, cationic allylic derivatives, anionic or cationic (meth)acryloyl hydrophobic derivatives, or anionic and/or cationic monomers derived from (meth) acrylamide bearing a hydrophobic chain.

This type of polymer does not require the development of a particular polymerization method. It may be obtained with all polymerization techniques well-known to one skilled in the art: gel polymerization, polymerization by precipitation, (aqueous or inverse) emulsion polymerization either followed by a distillation step or not, suspension polymerization, solution polymerization.

Said organic polymer in an advantageous embodiment is a chemically modified organic polymer, i.e. a polymer having been subject to a post-modification reaction.

By <<post-modification>> is meant here polymers having been subject to a modification of their chemical structure by reaction of one or more reagents after polymerization. As an example, mention will be made of hydrolysis and neutralization reactions, reactions for grafting functions or chains, or further reactions for modifying chemical functions (Mannich reaction, glyoxalation, grafting of a hydroxamate function, of hydrophobic or hydrophilic side chains, Hofmann degradation . . . ), pH adjustments (acidification, basification, buffering) . . . .

Further, in a known way, the polymer may also be branched or crosslinked. As this is known, a branched polymer is a polymer which has on its main chain branches, groups or branchings. A crosslinked polymer, as for it, is a polymer for which certain of its chains are connected together through covalent chemical bridges thereby forming a network. Branching or crosslinking may preferably be carried out during (or possibly after) the polymerization, in the presence of a branching/crosslinking agent and possibly a transfer agent. A non-limiting list of branching agents will be found below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, the compounds of the glycidylether type such as ethyleneglycol diglycidylether, or epoxies or any other means well-known to one skilled in the art, making branching possible.

In one alternative, the composition comprises a polymer consisting of a resin of the polyamine type based on epichlorohydrin, of the dicyanodiamide type, of the melamine-formaldehyde type, of the polyalkyleneimine type and the like.

Indeed, said polymer used may be obtained by a polycondensation reaction. By <<polycondensate>> is designated here water-soluble polymers obtained by polycondensation, i.e. by a polymerization process with repeated condensations either with the removal of simple molecules or not (in this case, reference will rather be made to polyadditions). The growth of the polymer chains is generated by the consumption of reactive groups whereas in radical reactions, the reactive groups are continuously generated during the growth of the chains. As polycondensates, mention will for example be made, of polyamines based on epichlorohydrin, dicyanodiamide resins, melamine-formaldehyde resins, polyalkyleneimines, . . . .

In a particular embodiment of the invention, said organic polymer is a non-ionic, anionic, cationic or amphoteric flocculent having an average molecular weight comprised between $5 \times 10^6$ g/mol and $40 \times 10^6$ g/mol.

In an advantageous alternative according to the invention, said organic polymer is a cationic or amphoteric coagulant and having an average molecular weight comprised between 20,000 and $5 \times 10^6$ g/mol Advantageously, the weight average molecular weight is greater than or equal to 50,000 g/mol, in particular greater than or equal to 200,000 g/mol and preferably greater than or equal to 500,000 g/mol. Further, the weight average molecular weight is advantageously less than or equal $3 \times 10^6$ g/mol.

In an advantageous embodiment, said cationic or amphoteric coagulant is based on a diallyldialkylammonium salt.

The compositions according to the invention are advantageously stable, so as to be prepared several days or even several weeks before their use.

The powdery compositions according to the invention have the advantage of the facility of a powder use, without it being necessary to resort to intermediate polymers in solid form, sometimes difficult and more costly to obtain as compared with solutions or emulsions.

Other embodiments of the compositions according to the invention are indicated in the appended claims. The object of the present invention is also a method for preparing a lime-based composition according to the invention, comprising putting a mineral agent in presence with an aqueous solution, dispersion or inverse emulsion, comprising at least one organic polymer and water. Such a method is for example known from document U.S. Pat. No. 4,711,727 which discloses the preparation of a slaked lime suspension (Hydralime) and of calcium carbonate (Snowcal) to which an organic polymer will then be mixed in order to treat waste water. Unfortunately, with such a method, it is not possible to obtain a ready-to-use stable composition in which intimate contact exists between the organic polymer and at least one portion of the mineral agent.

Therefore, in order to solve this problem, the invention provides a method characterized in that said mineral agent is based on quick lime, which reacts at least partially with all or part of said water containing said organic polymer and forms slaked lime in solid state into which said organic polymer is incorporated.

The size of the particles of the aforementioned mineral agent based on quick lime is not critical; some may notably attain several millimeters. In certain embodiments of the invention, the size of the particles will in majority be smaller than 2 mm, preferably smaller than 1 mm, advantageously 500 µm, most particularly 200 µm. Further, 90% of the particles present have a particle size greater than 0.5 µm, or even 1 µm.

In the method according to the invention, the water of the solution, dispersion, or inverse emulsion, containing the polymer, will react with the quick lime and/or evaporate under the exothermic action of the reaction, by which a easy-to-handle dry powdery solid (containing no or very little free water) may be obtained, in all the cases when the introduced amount of water does not exceed the amount of calcium oxide present. This powdery composition may therefore be obtained without having to resort to any separation of the water and of the solids by filtration and/or drying or any other solid/liquid separation means. The composition then appears essentially in the form of residual quick lime, at least partly coated with slaked lime, in which the organic polymer is regularly and intimately distributed.

If the introduced amount of water greatly exceeds the amount of CaO present, the composition appears as an aqueous suspension of slaked lime, in which the organic polymer is regularly and intimately distributed. In an intermediate case, the composition appears as a powdery solid slaked lime in which the organic polymer is regularly and intimately distributed.

According to the invention, the water applied may directly come from the commercial form of the polymer (aqueous solution, emulsion or dispersion), it may also, totally or partly, result from prior dissolution, suspension or dispersion of the polymer in an aqueous phase.

As an organic polymer, those mentioned above are used, in particular a cationic or amphoteric coagulant, based on diallyldialkylammonium salt.

According to an alternative of the method according to the invention, the method comprises separate addition of organic polymer, before or after said putting of a mineral agent based on quick lime in the presence of an aqueous solution, dispersion or inverted emulsion. Additionally, the method according to the invention may comprise separate addition of water before or after said putting of a mineral agent based on quick lime in the presence of an aqueous solution, dispersion or inverse emulsion.

As this may be ascertained, the method according to the invention does not require more infrastructure than the equipment in which slaking via a current route is carried out (slaking unit). The method may be carried out discontinuously (batchwise) or continuously. In certain embodiments of the method, the putting of quick lime in the presence of the aqueous solution or emulsion does not require any slaking infrastructure. The putting into presence may notably be carried out by sprinkling the quick lime with the aqueous solution or emulsion, for example, during dropping of quick lime or during its transfer on a conveyer belt or screw or further in a mill or else a mixer.

It is ascertained that with the method according to the invention, intimate contact is possible between the mineral agent based on lime and the organic polymer, by reaction of the quick lime and of the aqueous solution, dispersion or emulsion containing the organic polymer, in order to obtain slaked lime containing the polymer. Consequently, the latter minority component is actually distributed at the surface and/or within the solid phase of the mineral agent unlike simple mixing of the components. Further, in spite of reaction conditions which are very aggressive to it (strongly exothermic reaction and very caustic medium), the polymer applied in this way surprisingly retains its physical properties.

Other embodiments of the method according to the invention are indicated in the appended claims.

The invention also relates to a use of a composition as described above for its application in the treatment of water and sludge, in particular for conditioning sludge before their dewatering.

The use of a composition according to the invention for treating sludge allows a limitation in the number of agents namely for conditioning and allows treatment in a limited number of steps, or even a conditioning in a single step.

The compositions according to the invention for treating sludge have the advantage of exhibiting at the surface and therefore in an immediately available way, the organic polymer and the lime as $Ca(OH)_2$, which affect conditioning of water and sludge. In the embodiments of the compositions according to the invention, in which quick lime subsists, the latter remains partly available for an effect after the solid/liquid separation (in a post-treatment).

Preferentially, the composition according to the invention is used as a single agent for conditioning sludge, this conditioning being in particular carried out in a single step. The aforementioned use embodiments are simplified relatively to current practices which often require several sequentially introduced conditioning agents.

The use of the compositions according to the invention no longer requires resorting to iron salts for the conditioning of sludge, while being effective, notably by obtaining resistant flocks, in particular compatible with the use of filter presses. The conditioning of sludge is consequently also made more reliable, more performing and easy to apply, without the drawbacks of resorting to iron or aluminium salts.

The use of a composition according to the invention for treating sludge provides savings on energy and/or on conditioning agents (coagulant, lime).

Other uses according to the invention are mentioned in the appended claims.

Other features, details and advantages of the invention will become apparent from the description given hereafter, in a non-limiting way and with reference to the examples and to the figures.

The invention will now be described in more detail by means of non-limiting examples.

EXAMPLE 1

Formulation Composition According to the Invention

Industrial quick lime is used with a grain size in majority less than 90 micrometers and as an organic polymer, a coagulant comprising diallyldialkylammonium salts (polyDADMAC-FL4820 as a liquid comprising 20% of active material).

Three compositions are made according to the invention starting with the aforementioned reagents in the weight proportions shown in Table 1.

TABLE 1

| Formulation | FL4820/lime ratio |
| --- | --- |
| 1 | 25/100 |
| 2 | 12.5/100 |
| 3 | 6.25/100 |

In an asynchronous mixer kneader, 1,000 g of quick lime are introduced. The coagulant is then added in the proportions illustrated in Table 1, under stirring, so as to ensure good distribution and the stirring is maintained for 30 minutes. The temperature is regularly measured and the maximum temperature is recorded.

The results of Example 1 are illustrated in Table 2.

TABLE 2

| | Formulations | | |
| --- | --- | --- | --- |
| | 1 | 2 | 3 |
| Lime mass (g) | 1,000 | 1,000 | 1,000 |
| Coagulant mass (g) | 250 | 125 | 62.5 |
| Active matter amount (g) (1) | 50 | 25 | 12.5 |
| Added water amount (g) (1) | 200 | 100 | 50 |
| Maximum temperature reached during the mixing | 160° C. | 100-120° C. | 60° C. |

(1) Since poly-DADMAC is added as a liquid solution with a concentration of 20%, 250 g therefore comprise 50 g of active matter (AM) and 200 g of water (formulation 1).

As this may be ascertained, a significant rise in temperature is observed during the formulation due to the hydration reaction. The greater the added amount of poly-DADMAC, the higher is the recorded maximum temperature. As regards formulations 1 and 2, significant evaporation of the water is observed. All of the water does not react with lime, one portion of it evaporates because of the observed increase in temperature.

The three formulations in Table 3 are composite lime compositions comprising quick lime and slaked lime as well as the poly-DADMAC coagulant incorporated into the slaked lime in the solid phase. The formulations 2 and 3 comprise in majority quick lime while the formulation 1 comprises in majority slaked lime.

Table 3 shows the composition of the different formulations

TABLE 3

| | Formulations | | |
| --- | --- | --- | --- |
| | Composition 1 | Composition 2 | Composition 3 |
| Coagulant percentage (AM) | 5% | 2.5% | 1.25% |
| CaO percentage | 45% | 66% | 82% |
| $Ca(OH)_2$ percentage (estimation) | 50% | 31% | 17% |

EXAMPLE 2

Comparison of the Performances of the Compositions According to the Invention Relatively to a Composition Containing a Cationic Flocculent For the first test, the sludge is conditioned and then filtered, following analogous conditioning to the one used on the industrial site from which it comes from, in order to have a reference. The cationic flocculent used is Zetag 8160, available from CIBA. For the three other tests, compositions according to the invention are used prepared in the same way as in Example 1. The dosages of conditioning agents are expressed relatively to the dry matter (DM) of the sludge.

A digested sludge is therefore subject to four types of conditionings which are shown in Table 4 below. This conditioned sludge (200 g) is then filtered via a Faure filtration/compression cell, which simulates industrial filtration on a filter press. The filtration lasts for 30 minutes, while observing a gradual rise in pressure up to 5 bars within 2 minutes and this pressure is then maintained for the remainder of the time. The dry material is then measured on cakes formed after 24 hours in the oven at 105° C.

TABLE 4

| | Test No. | | | |
|---|---|---|---|---|
| | 1 | 2 | 3 | 4 |
| Conditioning | Organic flocculent | Composition 1 | Composition 2 | Composition 3 |
| Flocculent dosage (weight %) | 1% | — | — | — |
| Obtained dryness (weight %) | 19% | 33% | 34% | 21% |
| Cake discharge | Sticky | OK | OK | Sticky |
| Produced amount of sludge (Q) | 5.4 | 3.7 | 3.6 | 6.1 |

As this may be ascertained, the tests 2 and 3 (compositions 1 and 2) show improvement in filtration during the use of the formulations of Example 1. An improvement in the dryness of the formed cake is thus observed as well as its better discharge and a decrease in the amounts of produced sludge. Indeed, in order to compare the performances of different conditionings, in addition to dryness, an estimation of the amount of produced sludge will be sought. The following ratio is therefore defined: Q=Dewatered sludge amount/amount of initially dry material present in the sludge to be treated.

The last test does not show as good behavior, related to a too small dose of coagulant in the lime/polymer composition according to the invention. On the other hand, the combination of this composition 3 with an organic flocculent in a small amount provides an advantage illustrated in Example 5.

EXAMPLE 3

Comparison of the Performances of the Compositions According to the Invention Relatively to a Composition Containing Lime as Lime Milk and Iron Chloride A biological sludge is subject to the three compositions according to the invention used in Example 2.

For the first test, the sludge is conditioned and then filtered, following a conditioning like the one used on the industrial site from which it comes from, in order to have a reference A mineral conditioning is used, applying 40% of lime as lime milk and 10% of ferric chloride, based on the DM of the sludge.

The obtained results on the conditionings of biological sludge are shown in Table 5.

TABLE 5

| | Test | | | | |
|---|---|---|---|---|---|
| | 1 | 2 | 3 | 4 | 5 |
| CaO dosage | 40% | | | | |
| Coagulant dosage FeCl₃ | 10% | | | | 8% |
| Composition | | 1 | 2 | 3 | 3 |
| Formulation dosage | | 40% | 40% | 40% | 30% |
| Dryness | 33% | 31% | 22% | Non-filterable | 33% |
| Cake discharge | OK | OK | sticky | | OK |
| Amount of produced sludge (Q) | 4.9 | 4.0 | 5.7 | | 4.2 |

As this may be ascertained, with the composition 1 having been the subject to test 2, it is possible to obtain good dewatering of the biological sludge. With it, it is possible to obtain good cake discharge and a reduction in the produced sludge, relatively to the reference conditioning on the industrial site. Moreover in test 5, the composition 3, combined with ferric chloride in a smaller amount, also allows satisfactory dewatering and easy cake removal.

With the other formulations, it is not possible to obtain satisfactory results probably by lack of coagulant in the composition.

EXAMPLE 4

Stability of the Composition

In order to determine the stability of the different compositions according to the invention, comparative tests of conditioning of sludge are carried out by using freshly formulated compositions according to the invention and formulations stored beforehand for 2 weeks. After 2 weeks, no visible difference is observed. The tests are carried out on three different sludges, a digested sludge and two non-digested biological sludges. For each sludge, the composition according to the invention is used with which better conditioning performances may be obtained as this was able to be ascertained upon reading the Examples 1-3.

The results of the stability test according to the invention are shown in Table 6.

TABLE 6

| | Test No. | | | | | |
|---|---|---|---|---|---|---|
| | 1 | 2 | 3 | 4 | 5 | 6 |
| Sludge | digested | digested | biological 1 | biological 1 | biological 2 | biological 2 |
| Tested formulation | composition 2 | composition 2 | composition 1 | composition 1 | composition 1 | composition 1 |

TABLE 6-continued

| | Test No. | | | | | |
|---|---|---|---|---|---|---|
| | 1 | 2 | 3 | 4 | 5 | 6 |
| Storage of the reagents | no | 2 weeks | no | 2 weeks | no | 2 weeks |
| Dosage of the reagents (% of sludge DM) | 20% | 20% | 40% | 40% | 40% | 40% |
| Cake dryness (% DM) | 34% | 36% | 26% | 27% | 28% | 29% |

As this may be ascertained, in all the cases, it was possible to obtain good filtration performances, including after 2 weeks of storage of the compositions according to the invention.

A slight improvement in the dryness of the cakes is also observed for the compositions having been stored for 2 weeks.

EXAMPLE 5

Advantage on a Centrifuge

A biological sludge is subject to two types of conditioning before dewatering on a centrifuge. The first conditioning comprises adding a cationic flocculent and fine quick lime (<90 μm), partly slaked as disclosed in patent EP 1 154 958, which is added in powdery form while the second conditioning comprises adding the same cationic flocculent and the composition 3 according to the invention.

The tests are carried out on a centrifuge dewatered thickened sludge coming from a biological treatment.

The flocculent used is a strongly cationic branched flocculent in an emulsion form. The composition or the lime is injected into the sludge before injecting the flocculent. For each conditioning, the optimum dose of flocculent is used.

TABLE 7

| | | flocculent + quick lime | flocculent + composition 3 |
|---|---|---|---|
| flocculent dosage | kg AM./ton of sludge DM. | 1.2 | 0.77 |
| lime or composition 3 dosage | % sludge DM. | 29% | 29% |
| dewatered sludge dryness | % DM | 26-27% | 26-27% |

As this may be ascertained, in association with a flocculent, the composition according to the invention enables a reduction in the dose of flocculent to be applied while retaining the final dryness of the dewatered sludge and this for a same lime dosage.

Of course the present invention is by no way limited to the embodiments described above and many modifications may be made thereto without departing from the scope of the appended claims.

The invention claimed is:

1. A composition comprising at least a mineral agent and at least one organic polymer, characterized in that said composition is a lime based composition, wherein said mineral agent comprises at least a solid phase of slaked lime and in that said at least one organic polymer is incorporated into said solid phase of the slaked lime, and wherein the composition comprises between 2 grams and 100 grams of said at least one organic polymer for 1 kilogram of lime expressed as slaked lime, $Ca(OH)_2$, equivalents.

2. The composition according to claim 1, wherein said mineral agent further comprises quick lime.

3. The composition according to claim 2, wherein the slaked lime is present in an amount ranging from 0.5 to 99.8% by weight based on the weight of the composition.

4. The composition according to claim 2, wherein said quick lime is present in an amount ranging from 0.1% to 99.3% by weight based on the weight of the composition.

5. The composition according to claim 4, wherein said organic polymer is a linear, branched or cross-linked hydrophilic polymer of a non-ionic, anionic, cationic or amphoteric nature.

6. The composition according to claim 4, wherein said organic polymer is selected from the group consisting of organic polymers and of organic copolymers and comprises one or more monomers selected from the group consisting of anionic monomers having a carboxylic or sulfonic function and cationic monomers.

7. The composition according to claim 5, wherein said polymer consists of a resin of polyamine based on epichlorohydrin, of dicyanodiamide, of melamine formaldehyde, or of polyalkyleneimine.

8. The composition according to claim 5, wherein said organic polymer is a cationic or amphoteric coagulant, having an average molecular weight comprised between 20,000 and $5 \times 10^6$ g/mol.

9. The composition according to claim 8, wherein said cationic or amphoteric coagulant is based on diallyldialkylammonium salts.

10. The composition according to claim 2, wherein the slaked lime is present in an amount ranging from 1 to 99% by weight based on the weight of the composition.

11. The composition according to claim 2, wherein the slaked lime is present in an amount ranging from 10 to 70% by weight based on the weight of the composition.

12. The composition according to claim 1, comprising between 5 grams and 80 grams of the said at least one organic polymer for 1 kilogram of lime expressed as slaked lime, $Ca(OH)_2$, equivalents.

13. The composition according to claim 1, comprising between 10 grams and 65 grams of the said at least one organic polymer for 1 kilogram of lime expressed as slaked lime, $Ca(OH)2$, equivalents.

14. The composition according to claim 4, wherein said quick lime is present in an amount ranging from 20 to 80% by weight based on the weight of the composition.

15. The composition according to claim 6, wherein said one or more monomers is selected from the group consisting of acrylic acid, of methacrylic acid, of 2-acrylamido-2-methylpropane-sulfonic acid (AMPS), and their salts.

16. The composition according to claim 6, wherein said one or more monomers is selected from the group consisting of acrylamide, methacrylamide, N-vinyl pyrrolidone, vinyl acetate, vinyl alcohol, acrylate esters, allyl alcohol, N-vinyl acetamide and N-vinyl formamide.

17. The composition according to claim 6, wherein said one or more monomers is selected from the group consisting of dimethyl aminomethyl acrylate (DMAA), dimethyl aminomethyl methacrylate (DMAEMA), either quaternized or salified, dimethyldiallylammonium chloride (DADMAC), acrylamido propyltrimethylammonium chloride (APTAC) and methacrylamido propyltrimethylammonium chloride (MAPTAC).

18. A composition comprising at least a mineral agent and at least one organic polymer, characterized in that said composition is a lime based composition, wherein said mineral agent comprises at least a solid phase of slaked lime and in that said at least one organic polymer is incorporated into said solid phase of the slaked lime;
   wherein said mineral agent further comprises quick lime;
   wherein the slaked lime is present in an amount ranging from 0.5 to 99.8% by weight based on the weight of the composition;
   wherein said organic polymer is present in am amount from 0.2 to 10% by weight based on the weight of the composition;
   wherein said quick lime is present in an amount ranging from 0.1% to 99.3% by weight based on the weight of the composition;
   wherein said organic polymer is a linear, branched or crosslinked hydrophilic polymer of a non-ionic, anionic, cationic or amphoteric nature;
   wherein said polymer consists of a resin of polyamine based on epichlorohydrin, of dicyanodiamide, of melamine formaldehyde, or of polyalkyleneimine;
   wherein said organic polymer is a non-ionic, anionic, cationic, or amphoteric flocculent having an average molecular weight comprised between $5 \times 10^6$ g/mol and $40 \times 10^6$ g/mol.

19. A composition comprising at least a mineral agent and at least one organic polymer, characterized in that said composition is a lime based composition, wherein said mineral agent comprises at least a solid phase of slaked lime and in that said at least one organic polymer is incorporated into said solid phase of the slaked lime;
   wherein said mineral agent further comprises quick lime;
   wherein the slaked lime is present in an amount ranging from 0.5 to 99.8% by weight based on the weight of the composition;
   wherein said organic polymer is present in an amount from 0.2 to 10% by weight based on the weight of the composition;
   wherein said quick lime is present in an amount ranging from 0.1% to 99.3% by weight based on the weight of the composition;
   wherein said organic polymer is selected from the group consisting of organic polymers and of organic copolymers and comprises one or more monomers selected from the group consisting of anionic monomers having a carboxylic or sulfonic function and cationic monomers;
   wherein said organic polymer has associated therewith one or more hydrophobic monomers selected from the group consisting of esters of (methyl)acrylic acid, with an alkyl, arylalkyl and/or ethoxylated chain, derivatives of (meth)acrylamide with an alkyl, arylalkyl or dialkyl chain, cationic allylic derivatives, anionic or cationic hydrophobic (meth)acryloyl derivatives, or in association with one or more anionic and/or cationic monomers derived from (meth)acrylamide bearing a hydrophobic chain.

20. A method for preparing a composition according to claim 1, comprising the steps of:
   putting a mineral agent in the presence of an aqueous solution, dispersion or inverted emulsion, comprising at least one organic polymer and water, characterized in that said mineral agent is based on quick lime which reacts
   at least partially with all or part of said water containing said organic polymer, and
   forms slaked lime in solid phase into which said organic polymer is incorporated.

21. The method according to claim 20, further comprising:
   separate addition of organic polymer, before or after said putting of a mineral agent based on quick lime in the presence of an aqueous solution, dispersion or inverse emulsion.

22. The method according to claim 21, further comprising separated addition of water, before or after said putting of a mineral agent based on quick lime in the presence of an aqueous solution, dispersion or inverse emulsion.

* * * * *